United States Patent
Kasai et al.

(10) Patent No.: US 7,147,450 B2
(45) Date of Patent: Dec. 12, 2006

(54) INJECTION APPARATUS

(75) Inventors: Toshihiro Kasai, Edgewater, NJ (US);
Kazuhito Kobayashi, Numazu (JP);
Junsuke Kawai, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 425 days.

(21) Appl. No.: 10/622,427

(22) Filed: Jul. 21, 2003

(65) Prior Publication Data

US 2004/0228944 A1    Nov. 18, 2004

(30) Foreign Application Priority Data

Jul. 22, 2002   (JP)   ............................. 2002-212877

(51) Int. Cl.
*B29C 45/46* (2006.01)
*B29C 45/50* (2006.01)
*B29C 45/66* (2006.01)

(52) U.S. Cl. .................. 425/145; 425/150; 425/587

(58) Field of Classification Search ................ 425/145, 425/149, 150, 587
See application file for complete search history.

(56) References Cited

U.S. PATENT DOCUMENTS 6,227,839 B1 * 5/2001 Yoshida et al. ............. 425/145
6,386,853 B1 * 5/2002 Mizuno et al. ............. 425/145
6,814,558 B1 * 11/2004 Kubota et al. ............. 425/145

FOREIGN PATENT DOCUMENTS

| JP | 4-77228   | 3/1992 |
| JP | 6-229449  | 8/1994 |
| JP | 7-77227   | 3/1995 |
| JP | 7-213013  | 8/1995 |

OTHER PUBLICATIONS

Japanese Office Action, dated Jun. 15, 2004, for Patent Application No. 2002-212877.

* cited by examiner

*Primary Examiner*—Yogendra N. Gupta
*Assistant Examiner*—Thu Khanh T. Nguyen
(74) *Attorney, Agent, or Firm*—Pillsbury Winthrop Shaw Pittman, LLP

(57) ABSTRACT

An injection apparatus comprises a screw drive shaft, a motor which generates torque to rotate the screw, a speed reducer, and a power transmission mechanism. The power transmission mechanism has a first pulley on an output shaft of the motor, a second pulley on an input shaft of the speed reducer, and a belt passed around the first and second pulleys. The speed reducer is located between the second pulley and the screw drive shaft. The speed reducer is formed of a planetary gear mechanism, and both its input and output shafts are situated on an extension of an axis of the screw drive shaft.

1 Claim, 2 Drawing Sheets

INJECTION APPARATUS

CROSS-REFERENCE TO RELATED APPLICATIONS

This application is based upon and claims the benefit of priority from the prior Japanese Patent Application No. 2002-212877, filed Jul. 22, 2002, the entire contents of which are incorporated herein by reference.

BACKGROUND OF THE INVENTION

1. Field of the Invention

The present invention relates to an injection apparatus provided with a screw rotating mechanism used in an electric injection molding machine.

2. Description of the Related Art

An injection apparatus is provided with a motor for rotating a screw. As the screw is rotated, a material such as resin is kneaded and melted. The rotatory force of the motor is transmitted to the screw through a first pulley on the output shaft of the motor, a second pulley on the axis of the screw, a belt passed between and around the pulleys, etc., for example. In this case, some reduction ratio can be obtained by making the diameter of the second pulley larger than that of the first pulley.

The reduction ratio of a power transmission mechanism that uses the conventional pulleys described above depends on the difference between the respective diameters of the pulleys. Owing to spatial restrictions, therefore, the outside diameter of the second pulley on the screw side can be increased only limitedly. Thus, the reduction ratio that can be obtained by means of the pulleys is a few tenths at the most.

In order to knead a high-viscosity material, the torque of the screw must be increased. Since the reduction ratio is limited, however, the motor must be replaced with one that enjoys higher output, in some cases. However, replacing the motor is troublesome and sometimes requires change of a motor mounting section or a control device, thus entailing higher cost.

If the motor output is enhanced to increase the torque, tension that acts on the belt increases. In consequence, the belt easily wears and produces dust or requires more frequent replacement. If the tension on the belt increases, it must be controlled rather precisely. Besides, a heavier eccentric load acts on the screw. If the eccentric load grows, the screw cannot be rotated with ease and may possibly be broken.

The reduction ratio may possibly be increased by maximizing the outside diameter of the second pulley on the screw side. If this is done, however, the width and height of the frame of the injection apparatus or structural members around the pulleys increase inevitably. Accordingly, the injection apparatus is large-sized as a whole, and entails higher cost and increased weight.

The necessary speed reducing performance of the general-purpose injection apparatus with the conventional construction depends on the power transmission elements that include the pulleys, belt, etc. In consideration of restrictions on the overall size of the apparatus or the positions of the power transmission elements relative to their peripheral parts, the transmission elements are maximized in size, in many cases. Accordingly, the reduction ratio cannot be changed with ease or can be changed only within a narrow range.

If a user of the injection apparatus makes a request for higher speed reducing capability, therefore, the reducing capability can be increased only slightly. Thus, the conventional construction cannot readily comply with the user's request at a reasonable cost.

BRIEF SUMMARY OF THE INVENTION

Accordingly, the object of the present invention is to provide an injection apparatus, in which rotating members, such as pulleys of a power transmission mechanism, can be reduced in size, and which can comply with a request for an extensive increase of the reduction ratio.

An injection apparatus according to the invention comprises a screw drive shaft which is connected to an end portion of a screw and rotates integrally with the screw, a motor which generates torque to rotate the screw drive shaft, a rotating member situated on an extension of an axis of the screw drive shaft, a power transmission mechanism which transmits the rotation of the motor to the rotating member, and a speed reducer which is located between the rotating member and the screw drive shaft, reduces the speed of rotation of the rotating member, and transmits the rotation of the rotating member to the screw drive shaft.

The injection apparatus of the invention can combine the respective speed reducing functions of the speed reducer and the power transmission mechanism, which comprises the rotating member, e.g., a pulley, thereby obtaining a wider variety of reduction ratios. According to the invention, moreover, the diameter of the rotating member can be minimized. If the reduction ratio must be increased, therefore, its change can be easily coped with by replacing the rotating member with a larger one.

Preferably, the speed reducer has an input shaft fitted with the rotating member and an output shaft connected to the screw drive shaft, the input and output shafts being situated on the extension of the axis of the screw drive shaft. Preferably, in this case, a planetary gear mechanism should be used as the speed reducer. Alternatively, a traction drive mechanism may be used as the speed reducer. The traction drive mechanism described herein is a mechanism in which torque is transferred between a plurality of sets of rotating elements in a manner such that the rotating elements touch one another in a traction area. A power transmission mechanism that uses the traction drive mechanism can obtain a reduction ratio that matches the radius of rotation of the traction area.

Preferably, moreover, the power transmission mechanism has a first pulley on an output shaft of the motor, a second pulley for use as the rotating member on the input shaft of the speed reducer, and a belt passed around the first and second pulleys.

The present invention may be applied to an injection apparatus for synthetic resin products and an injection apparatus for elastic products of rubber (natural rubber or synthetic rubber such as silicone rubber), elastomer, or the like. Alternatively, the invention is applicable to an injection apparatus for metallic products of aluminum die casting or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to FIG. 1.

Figure 1:
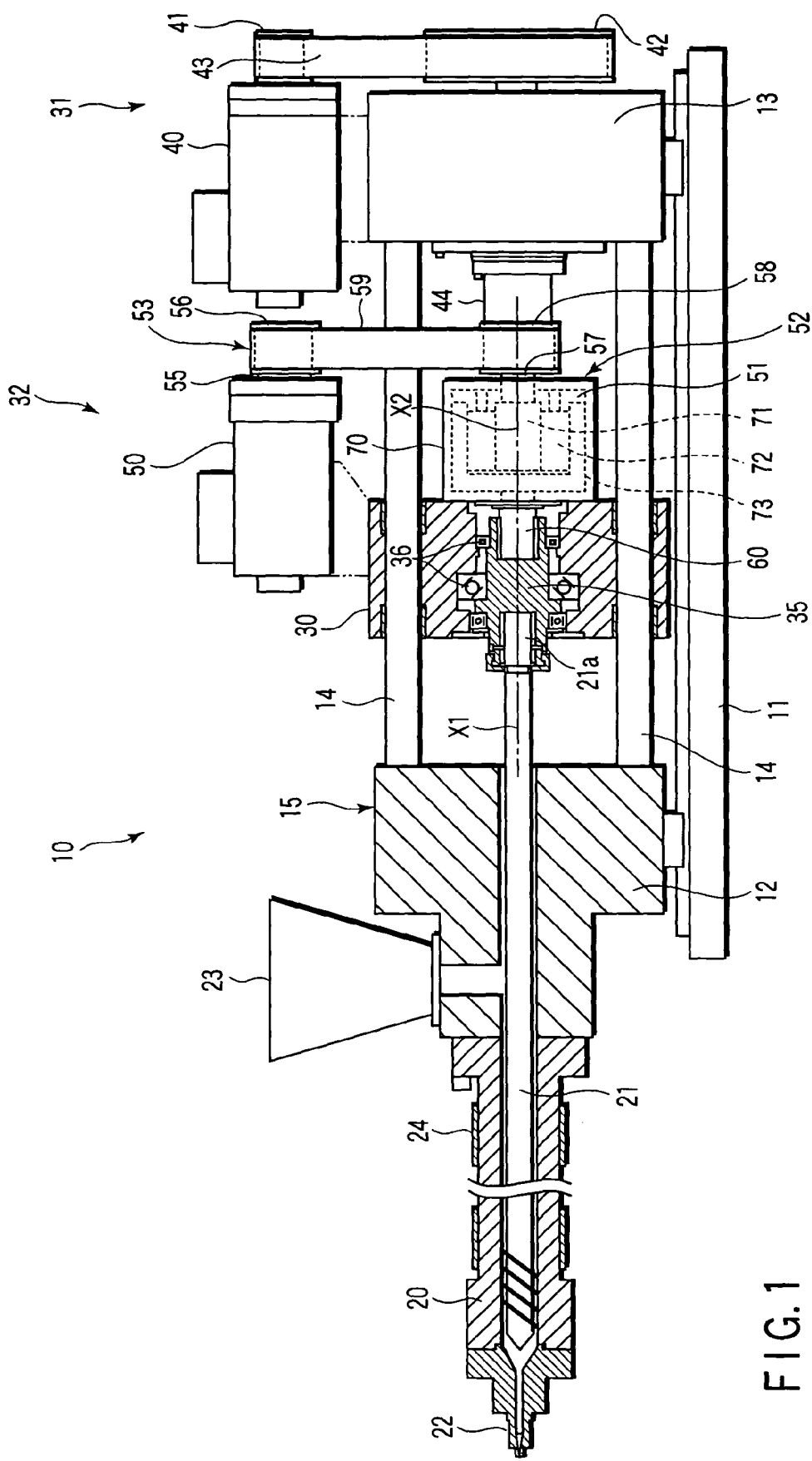
FIG. 1 is a sectional view of an injection apparatus according to an embodiment of the invention, taken along its axis.

An injection apparatus 10 for an electric injection molding machine shown in FIG. 1 comprises first and second structural members 12 and 13 arranged on a base 11 and a plurality of guide bars 14 (e.g., four in number) that connect the members 12 and 13. The guide bars 14 extend parallel to one another. The structural members 12 and 13, guide bars 14, etc. constitute a frame structure 15.

A heating barrel 20 is mounted on the first structural member 12. The barrel 20 contains a screw 21 therein. A nozzle 22 is attached to the distal end portion of the barrel 20. A hopper 23 that supplies the material of injection-molded products is located near the proximal portion of the barrel 20. The barrel 20 is provided with a heater 24 for heating the material.

The injection apparatus 10 comprises a movable structural member 30, a screw extruding mechanism 31, a screw rotating mechanism 32, etc. The structural member 30 can reciprocate straight in the axial direction of the screw 21 along the guide bars 14. The extruding mechanism 31 serves to reciprocate the screw 21 in the axial direction. The rotating mechanism 32 serves to rotate the screw 21.

A screw drive shaft 35 is located in the movable structural member 30. The shaft 35 is rotatably supported in the structural member 30 by means of a bearing 36. An end portion 21a of the screw 21 is coupled to the screw drive shaft 35.

The end portion 21a of the screw 21 and the screw drive shaft 35 are prevented from rotating relatively to each other by means of a key member or the like, and are fixed to each other in the axial direction. Thus, the shaft 35 and the screw 21 can rotate and move integrally with each other in the circumferential and the axial direction.

The screw extruding mechanism 31 includes an injection motor 40, pulleys 41 and 42 and a belt 43 for use as power transmission elements, ball screws 44, etc. For example, a pair of ball screws 44 are arranged between the second structural member 13 and the movable structural member 30. The structural member 30 can be moved in the axial direction of the screw 21 along the guide bars 14 by rotating the ball screws 44 by means of the motor 40.

The screw rotating mechanism 32 comprises a motor 50, a speed reducer 52, and a power transmission mechanism 53. The motor 50 serves as a drive source that generates torque for rotating the screw drive shaft 35. The reducer 52 is formed of a planetary gear mechanism 51. The mechanism 53 is used to transmit the rotation of the motor 50 to the reducer 52. The motor 50, speed reducer 52, and power transmission mechanism 53 are mounted on the movable structural member 30. The motor 50, reducer 52, and mechanism 53, along with the structural member 30, can move along the guide bars 14.

The power transmission mechanism 53 includes a first pulley 56 on an output shaft 55 of the motor 50, a second pulley 58 on an output shaft 57 of the speed reducer 52, and a belt 59 passed around the first and second pulleys 56 and 58. The second pulley 58 is equivalent to a rotating member according to the present invention. It is situated on an extension X2 of an axis X1 of the screw drive shaft 35.

The speed reducer 52 is located between the second pulley 58 and the screw drive shaft 35. The reducer 52 serves to reduce the speed of rotation of the pulley 58 and transmit the rotation to the shaft 35.

The speed reducer 52, which is composed of the planetary gear mechanism 51, has an input shaft 57 that is fitted with the second pulley 58 and an output shaft 60 that is connected to the screw drive shaft 35. Both the input and output shafts 57 and 60 are situated on the extension X2 of the axis X1 of the shaft 35.

An example of the planetary gear mechanism 51 is provided with a sun gear 71, planet gear 72, ring gear 73, etc. that are arranged in a casing 70. It serves to reduce the speed of rotation of the input shaft 57, increase the torque of the rotation, and transmit the rotation to the output shaft 60.

The following is a description of the operation of the injection apparatus 10 constructed in this manner.

If the ball screws 44 are rotated by means of the motor 40 of the screw extruding mechanism 31, the movable structural member 30 moves along the axis X1 of the screw drive shaft 35. Thereupon, the screw 21 advances in the direction of the axis X1. As the screw 21 advances in this manner, the material in the heating barrel 20, metered in advance, is pushed out through the tip of the nozzle 22 by means of the screw 21, and fills a die (not shown).

As the motor 50 of the screw rotating mechanism 32 is rotated, moreover, the screw drive shaft 35 is rotated with the aid of the power transmission mechanism 53 and the speed reducer 52. If the shaft 35 rotates, the screw 21 rotates.

More specifically, the second pulley 58 is rotated by means of the belt 59 if the first pulley 56 is rotated by means of the motor 50. Thus, the input and output shafts 57 and 60 of the speed reducer 52 rotate, so that the screw drive shaft 35 and the screw 21 rotate.

If the screw 21 is rotated, the material in the heating barrel 20 is fed to the distal end of the heating barrel 20 as it is kneaded, melted, and metered. After the material that is injected into the die is cooled, the die is opened, and the resulting molded product is thrust out by means of an ejector mechanism, whereupon one cycle of injection molding operation is finished.

In the screw rotating mechanism 32 of this embodiment, the speed reducer 52 that is formed of the planetary gear mechanism 51 has its intrinsic primary reduction ratio $\xi_1$. On the other hand, the power transmission mechanism 53 has a secondary reduction ratio $\xi_2$ that corresponds to the difference in outside diameter between the first and second pulleys 56 and 58. As the motor 50 rotates, therefore, the screw drive shaft 35 rotates at a speed corresponding to a composite reduction ratio $(\xi_1 \times \xi_2)$, the product of the primary and secondary reduction ratios $\xi_1$ and $\xi_2$, and the screw 21 rotates at the same speed corresponding to $(\xi_1 \times \xi_2)$.

Thus, according to the embodiment described above, the obtained reduction ratio $(\xi_1 \times \xi_2)$ is higher than the individual reduction ratios $\xi_1$ and $\xi_2$ obtained when the speed reducer 52 and the power transmission mechanism 53 are used independently of each other, and the torque can be increased correspondingly.

In this case, the diameter of the second pulley 58 can be minimized when compared with the case of the conventional injection apparatus that is not provided with the speed reducer 52. If the diameter of the second pulley 58 can be reduced, the space between the pulley 58 and the guide bars 14 can be widened.

Figure 2:
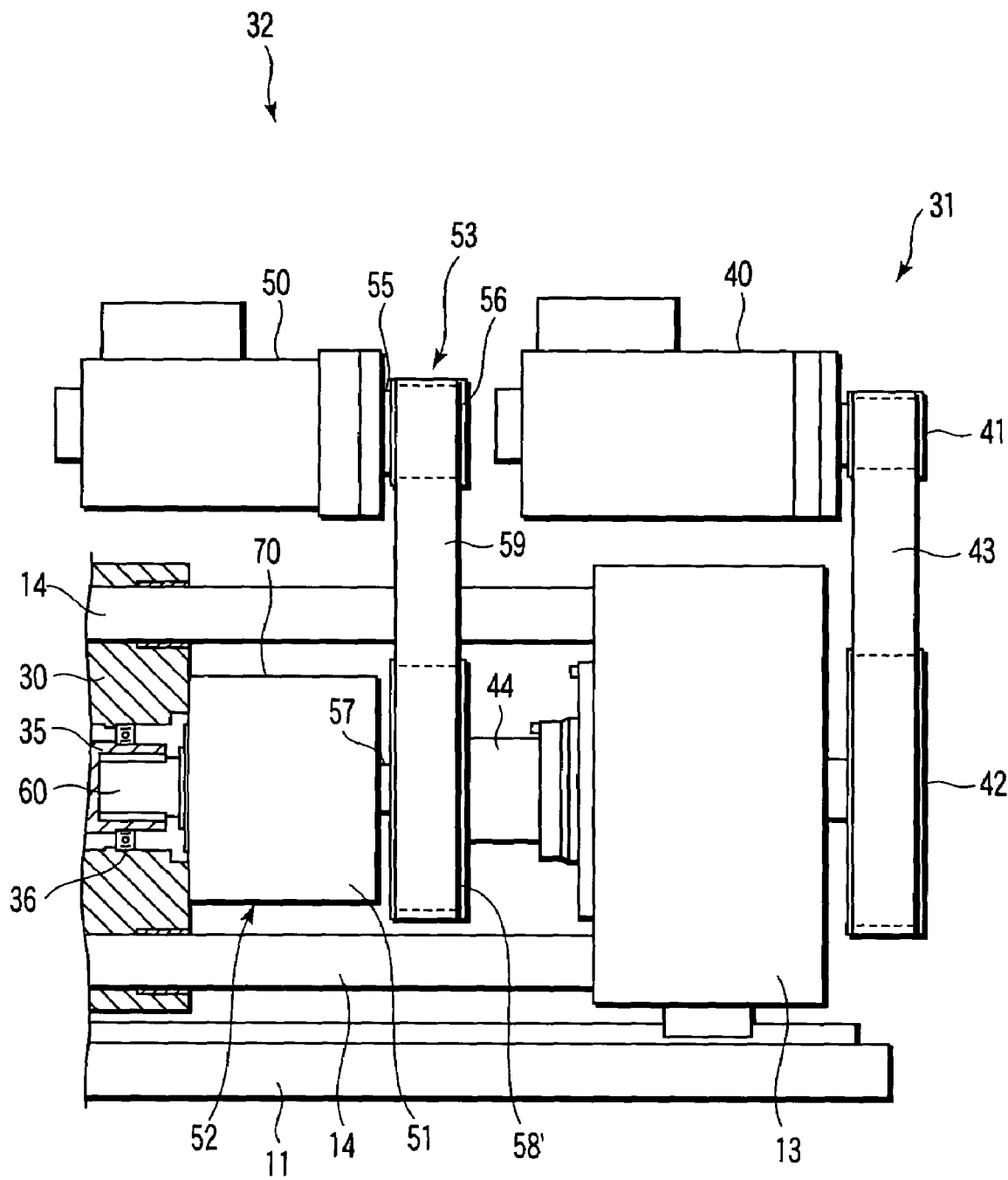
FIG. 2 is a partial front view of the injection apparatus of FIG. 1 using a large-diameter second pulley as an alternative.

If the reduction ratio must be increased, therefore, a reduction ratio $\xi_2'$ can be made higher than the reduction ratio $\xi_2$ for the case where the small pulley 58 is used by replacing the pulley 58 with a large-diameter pulley 58', as shown in FIG. 2. Thus, a composite reduction ratio ($\xi_1 \times \xi_2'$) compared with the reduction ratio of the speed reducer 52 increases, so that the torque can be increased further.

According to the injection apparatus 10 described above, the rotational frequency and torque of the screw 21 can be set variously by replacing the speed reducer 52. The reduction ratio $\xi_1$ of the speed reducer 52 can correspond to a wide range from a few tenths to a few hundreds. If a plurality of types of casings 70 of the same size are provided for the speed reducer 52 without regard to the reduction ratio $\xi_1$ moreover, extensive operating conditions can be met without changing the motor 50 by only replacing the speed reducer 52. The change of the speed reducer 52 can be coped with by changing a parameter of a control device.

In this injection apparatus 10, a satisfactory reduction ratio $\xi_1$ can be obtained with use of the speed reducer 52. An extended space can be secured for the second pulley 58 to cope with an anticipated increment of the reduction ratio for metering. Thus, the reduction ratio $\xi_2$ can be easily increased by replacing the second pulley 58 with a larger one if it must be increased. If the reduction ratio $\xi_2$ increases, the reduction ratio of a metering mechanism as a whole also increases.

Thereupon, the torque of the screw 21 can be increased to keep the tension of the belt 59 constant without enhancing the output of the motor 50. Thus, the quantity of dust that is produced as the belt 59 wears is reduced, and the replacement cycle of the belt 59 is lengthened.

In the speed reducer 52 that is formed of the planetary gear mechanism 51, the input and output shafts 57 and 60 can be located on the same axis, that is, the extension X2 of the axis X1 of the screw drive shaft 35. Since the screw 21 is rotated by means of the speed reducer 52, therefore, it cannot be easily subjected to eccentric load.

Since the speed reducer 52 and the power transmission mechanism 53 are used in combination with each other, moreover, the resulting apparatus is space-saving. In other words, the injection apparatus 10 never requires any large-sized pulley to ensure the reduction ratio, which is required by the conventional apparatus, so that the space between the guide bars 14 can be narrowed. Thus, the apparatus 10 can be made compact. Further, the speed reducer 52 that is formed of the planetary gear mechanism 51 can be made compact.

Thus, the space between the guide bars 14 can be narrowed, the driving part of the injection apparatus 10 can be made lightweight despite the additional use of the speed reducer 52. In consequence, the load on the injection motor 40 is lessened, so that the economical efficiency of the injection apparatus 10 can be improved further.

In carrying out the present invention, the power transmission mechanism 53 may, for example, be formed of a wrapping transmission mechanism that uses a chain and sprockets or a gear-type transmission mechanism based on a combination of gears, as well as the combination of the pulleys and the belt according to the embodiment described above. Further, a linear motor or hydraulic cylinder may be used as a drive source for pushing out the screw in the axial direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection apparatus comprising:
   a screw drive shaft which is connected to an end portion of a screw and rotates integrally with the screw;
   a plurality of guide bars provided in parallel with the screw drive shaft;
   a motor which generates torque to rotate the screw drive shaft;
   a pulley situated on an extension of an axis of the screw drive shaft, wherein the pulley is exchangeable to a small-diameter pulley or a large-diameter pulley, and is arranged in a space surrounded by the guide bars;
   a power transmission mechanism which transmits the rotation of the motor to the pulley; and
   a planetary gear mechanism, which is located between the pulley and the screw drive shaft, adapted to reduce the speed of rotation of the pulley, and to transmit the rotation of the pulley to the screw drive shaft, wherein the planetary gear mechanism is arranged in a space surrounded by the guide bars, and has an input shaft fitted with the pulley and an output shaft connected to the screw drive shaft, the input and output shafts being situated on the extension of the axis of the screw drive shaft.

* * * * *